Dec. 6, 1955        J. E. JOHNSON        2,725,915
SELF-LOCKING STUD INSERT
Filed Sept. 21, 1951
FIG.I.
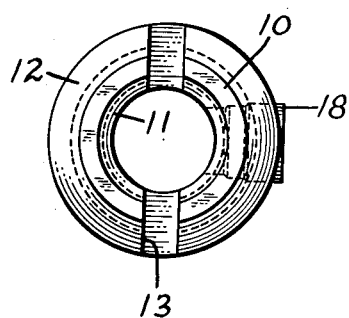
FIG.3.
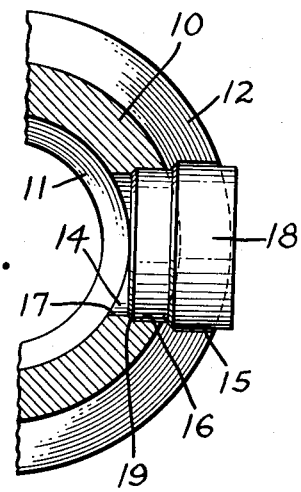
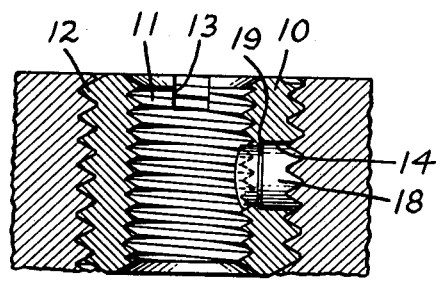
FIG.2.
INVENTOR.
JOHN E. JOHNSON
BY
HIS ATTORNEYS.

United States Patent Office 2,725,915
Patented Dec. 6, 1955

2,725,915

SELF-LOCKING STUD INSERT

John E. Johnson, Summit, N. J., assignor to The Nylok Corporation, Elmira Heights, N. Y., a corporation of Delaware Application September 21, 1951, Serial No. 247,646

1 Claim. (Cl. 151—7)

This invention relates to improvements in self-locking threaded members and it relates particularly to internally and externally threaded stud inserts having friction locking means associated therewith.

Frequently, in the assembly of machine elements, it is necessary to insert in a threaded hole in a member an externally threaded sleeve having an internally threaded aperture to receive a smaller screw or bolt than that which would be required to fit the threaded hole in the member. Such internally and externally threaded reducing sleeves are commonly referred to, and will be referred to hereinafter, as "stud inserts."

It would be highly desirable to incorporate into such stud inserts a friction locking element which would not protrude beyond the ends of the insert. However, considerable difficulty has been encountered in providing an arrangement whereby a friction locking element can be introduced into and retained in the stud insert. No particular problem is involved in providing a plug of resilient material such as rubber, synthetic rubber, nylon or other resilient plastic in the outer surface of the stud insert for cooperation with the threads in the hole in which the insert is received. The introduction of a locking plug into the interior of the stud insert presents a much more difficult problem because it is difficult to drill recesses in the interiors of such inserts for they frequently are of quite small internal and external diameter. Moreover, if such a recess could be drilled in the interior wall of the insert, it would be difficult, if not impossible, to insert the resilient friction locking plug into the recess with any automatic machine.

It is not practical to drill a hole of uniform diameter completely through a wall of the stud insert and insert a plug of "nylon" or other friction material in the hole so that its ends project beyond the root planes of the internal and external threads. If the hole has a diameter the same as the diameter of the plug, the plug will work or fall out of the opening. If the hole is made smaller than the diameter of the friction plug, great difficulty is encountered in introducing the plug into the opening because the plug tends to spread and will engage the threads and will buckle and otherwise resist introduction into the opening. For that reason, stud inserts of the type which have been desired heretofore have not been produced in any mass production operation.

The present invention provides a self-locking stud insert which can be manufactured by means of automatic machines and in which a plug of "nylon" or other resilient friction material is retained firmly in the insert with the inner end of the plug lying outwardly of or at about the roots of the internal threads of the insert and the outer end of the plug extending outwardly beyond the roots of the external threads and preferably adjacent the crests of the external threads to afford a friction locking action and a powerful lateral deflection of the threaded members to force the threads of the members into tight frictional engagement.

In accordance with the present invention, a hole is drilled through a wall of the stud insert, this hole having portions of progressively smaller diameter arranged in steps from outside to the inside of the stud insert. The outer end of the hole is large enough to receive freely the end of a plug of "nylon" or the like so that the plug can be started into the hole without interference from the surrounding threads and then gradually forced with a tight press fit into a smaller diameter portion of the hole to afford a strong frictional engagement between the plug and the wall of the stud insert and prevent the plug from being dislodged from the hole. The plug is press fitted into the second step of the hole and does not extend into the third step until the external thread is engaged. The outer end of the plug, being larger than the compressed inner portion of the plug also prevents the plug from being moved inwardly until the insert is threaded into a hole in a member. When the stud insert is threaded into a member, the plug is forced inwardly and extends beyond the root lines of the internal threads of the insert to engage the threads of a screw or bolt inserted in the internal opening of the insert.

For a better understanding of the present invention, reference may be had to the accompanying drawing, in which:

Fig. 1 is a plan view of a typical stud insert embodying the present invention;

Fig. 2 is a view in vertical section showing the stud insert threaded into a member to reduce the size of a hole therein; and Fig. 3 is a fragmentary view in horizontal section through the stud insert shown in Fig. 1.

The stud insert described herein is of a conventional type consisting of a hollow cylindrical body 10 having internal threads 11 and external threads 12. The upper end of the insert may be provided with a kerf 13 to receive the end of a screw driver or the like for screwing the insert into a threaded hole in a member. The internal threads 11 are intended to receive a screw, bolt or the like of smaller diameter than the hole in which the insert is mounted.

In order to render such an insert self-locking, a hole 14 may be drilled through a wall of the insert about midway of its length. As shown in Figs. 2 and 3, the hole may be drilled in three stages with progressively smaller drills to provide an outer larger diameter bore 15, an intermediate smaller diameter bore 16 and an inner still smaller diameter bore 17. The bore 15 extends from the outer ends of the threads to a point or plane inwardly of the root lines of the outer threads 12. The inner bore 17 extends from the root line of the threads 11 out to their inner crest edges. The bore 16 therefore extends substantially through the width of the body portion between the roots of the external and internal threads 11 and 12.

In a typical stud insert for a 7/16 inch hole and receiving a ¼ inch screw, the diameter of the bore 15 may be .157 inch; the bore 16 may be .150 inch; and the diameter of the bore 17 may be .135 inch. The depth of the bore 15 is .045 inch and the bore 16 is .055 inch. It will be understood that these dimensions can be varied in different sizes of stud inserts.

The locking element 18 which serves to firmly lock the insert in position and to lock the screw or bolt to the insert 10 may consist of a cylindrical plug of "nylon" or other resilient plastic or rubbery material which has an external diameter about the same as or slightly less than the diameter of the bore 15. For the above described 7/16" stud, the diameter of the plug is .154 inch and its length is .110 inch. This enables the plug to be forced into the bore 15 which tends to retain the plug in alignment when further pressure is exerted on the plug to force it into the smaller bore 16. The deformation of the plug 18 causes it to engage the wall of the bore 16 with a very tight press fit to retain the plug firmly against outward movement. The shoulder 19 between the hole portions 16 and 17, as shown in Figs. 2 and 3, engages the inner end of the plug 18 and restrains it sufficiently against inward movement to give the required torque on the external thread. The larger outer end of the plug, of course, also resists inward movement of the plug. The force acting to displace the plug inwardly when the insert is screwed into an opening causes the plug 18 to bulge or be extruded into the hole portion 17 beyond the roots of the threads 11, as shown in Fig. 2. When a bolt or screw is threaded into the opening in the insert, the bulging or extruded portion of the plug will engage the threads of the screw and will be deformed thereby, in some cases flowing between the threads 11 and the screw or bolt threads to lock the elements together.

While the friction plug has been shown as mounted in a hole having three steps therein, it will be understood that more than three steps may be used if desired and in inserts having a thicker wall section only two steps may be used. Therefore, the form of the invention disclosed herein should be considered as illustrative and not as limiting the scope of the following claim.

I claim:

A self-locking stud insert comprising a hollow cylindrical member having a radial opening through a side thereof, threads on the interior and the exterior of said member, portions of said threads being interrupted by said opening, said opening having three coaxial cylindrical wall portions of progressively smaller diameters, from the outer end to the inner end of said opening, said cylindrical wall portions being separated by a pair of outwardly facing shoulders, the outer shoulder being adjacent to the roots of the exterior threads, the innermost of said shoulders being substantially at the roots of the interior threads, a cylindrical plug of "nylon" having substantially flat end faces in said opening, one end face bearing against the innermost shoulder to restrain said plug against inward movement, said plug having a diameter substantially the same as the diameter of the largest diameter wall portion and being compressed into a smaller diameter wall portion, the inner end face of the plug being adjacent to the roots of the interior threads and the outer end face of the plug being disposed outwardly of the roots of the exterior thread a substantial distance for engagement with the threads of a threaded opening, and a kerf in one end of said cylindrical member to receive a screw driver for screwing the insert into said threaded opening.

References Cited in the file of this patent
UNITED STATES PATENTS

| | | |
|---|---|---|
| 1,624,764 | Sale | Apr. 12, 1927 |
| 2,400,348 | Greene | May 14, 1946 |
| 2,481,762 | Lewis | Sept. 13, 1949 |
| 2,499,104 | Lovell | Feb. 28, 1950 |
| 2,544,096 | Laughlin | Mar. 6, 1951 |
| 2,621,697 | McPherson | Dec. 16, 1952 |